Nov. 4, 1969     T. M. LIS     3,476,891
SLIDE TYPE ELECTRIC SWITCH
Filed Aug. 20, 1968
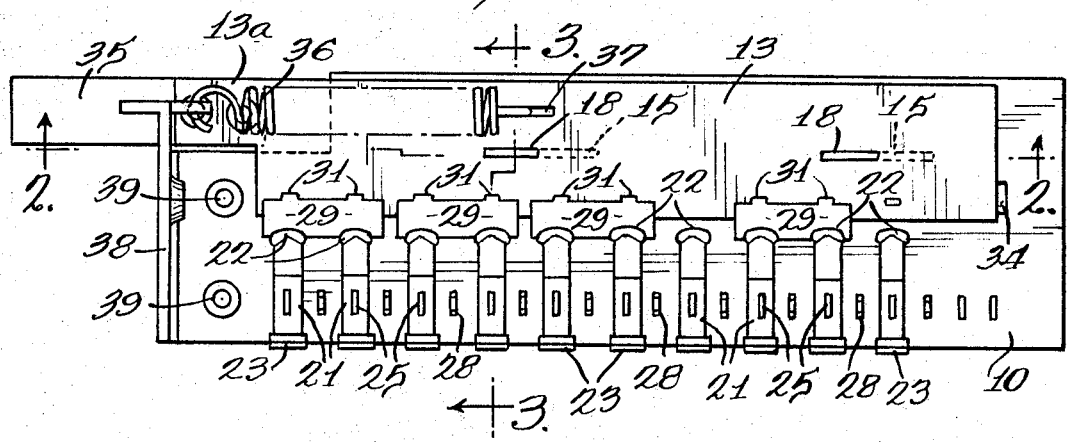
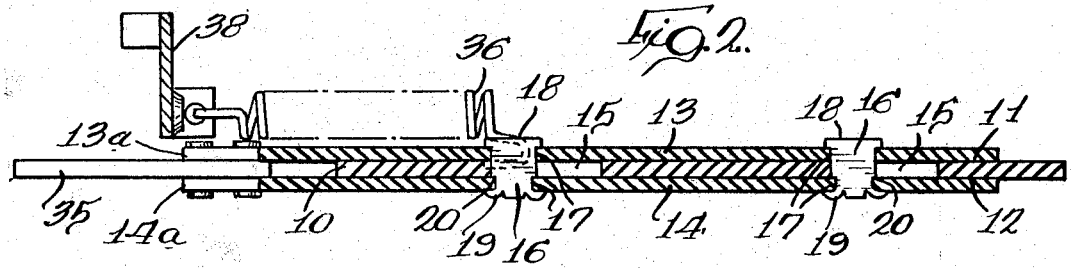
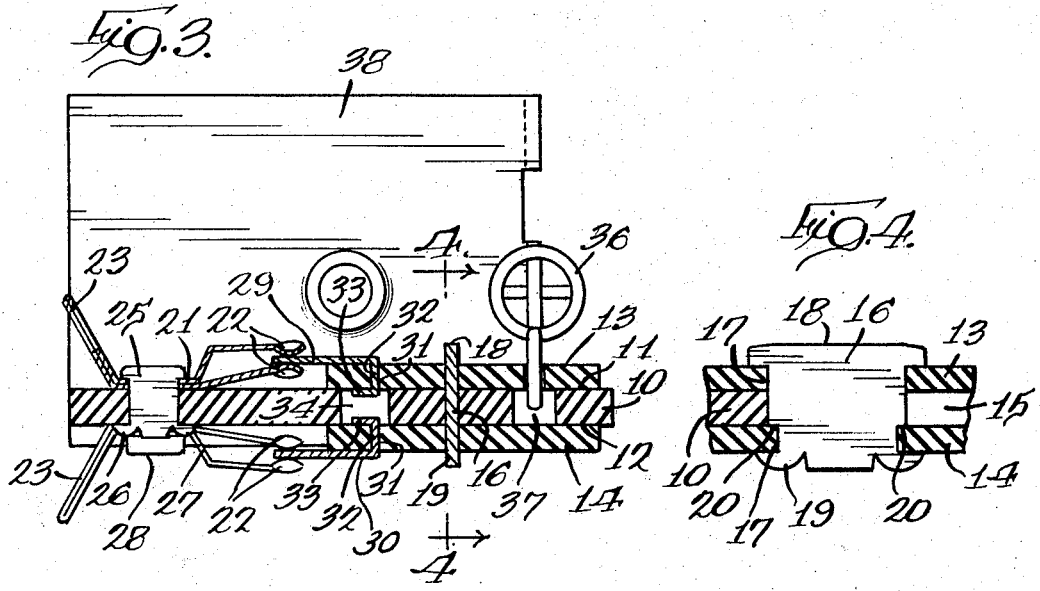
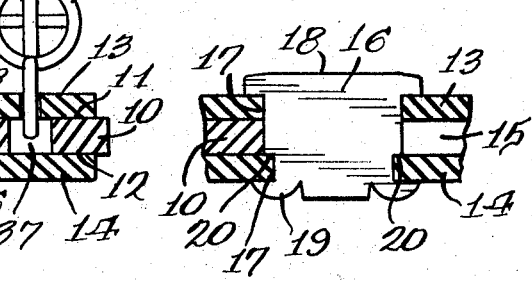
Inventor
Theodore M Lis
By Stanley Hoade
Atty

United States Patent Office 3,476,891
Patented Nov. 4, 1969

3,476,891
SLIDE TYPE ELECTRIC SWITCH
Theodore M. Lis, Aurora, Ill., assignor to Kollsman Instrument Corporation, Elmhurst, N.Y., a corporation of New York
Filed Aug. 20, 1968, Ser. No. 753,916
Int. Cl. H01h 15/02
U.S. Cl. 200—16    5 Claims

ABSTRACT OF THE DISCLOSURE

A slide switch wherein a pair of insulating panels are interconnected for sliding movements in unison along a fixed line of travel against opposite faces of a stator sandwiched between said panels by means of fasteners having opposed parallel faces and slots in said stator having opposed longitudinal edges with which said faces of said fasteners having riding engagement, and contacts on said panels having circuit enclosing engagement in turn with contact clips on said stator in response to movement of said panels relative to said stator.

---

This invention relates to an electric switch and more particularly a switch of the type wherein fixed contact members attached to an insulating stator so as to occupy spaced apart positions along a straight line are engaged in turn by one or more contact blades secured to a slider having guided movement in a fixed path parallel to the line along which the stator contact members are arranged.

An object of this invention is the provision of a slide switch designed for installation wherein compact, relatively small dimensioned elements are required while retaining a structural integrity so as to withstand stresses encountered in the operation of the switch.

A further object of this invention is to provide a switch of this type which is characterized by its simplicity in construction and assembly and the economy with which it may be manufactured in quantity production.

Other and further objects and advantages of this invention will become apparent from the following detailed description taken in connection with the accompanying drawings, in which:

FIG. 1 is a top plan view of a switch embodying the features of the present invention.

FIG. 2 is a section taken along line 2—2 of FIG. 1.

FIG. 3 is a section taken along line 3—3 of FIG. 1.

FIG. 4 is a section taken along line 4—4 of FIG. 3.

An electric switch exemplifying the subject matter of this invention as illustrated in the drawings includes a stator 10 of Bakelite or other suitable insulating material. An area 11 defined by a portion of one face of the stator 10 and an area 12 defined by a corresponding portion of the other face of the stator opposite area 11 present generally flat parallel surfaces. Disposed against opposite faces of the stator 10 so as to overlap only the areas 11 and 12 of the stator are a pair of panel members 13 and 14 of rigid insulating material. Reference numeral 15 designates each of a pair of elongated slots formed in said areas of the stator thus overlapped by the panel members 13 and 14. Opposed parallel faces of a fastener 16 interconnecting the panel members 13 and 14 having riding engagement with opposite longitudinal edges of the slot 15 in the stator. Aligned openings 17 in the panel members 13 and 14 are of such contour as to provide a tight fit between the edges of said openings and the surfaces of the fastener contained therein which face said edges of said openings 17. The openings 17 are so located as to establish the positions of the fasteners 16 at a distance apart compatible with the movement of the panel members 13 and 14 fore and aft of the slots 15 required to dispose the panel members in selected operating positions relative to stator contact clips more particularly hereinafter referred to. Exposed surfaces of the panel member 13 bordering opposite ends of the openings 17 are engaged by a head 18 defined by one end of the fastener 16, as shown in FIG. 4, and staking ears 19 formed by outspread edge portions of the other end of the fastener 16 engage opposite ends of the opening 17 at the exposed surface of the panel member 14. The staking ears 19 in cooperation with a shoulder 20 defined by inwardly offset portions of opposite edges of the fastener 16 which engage opposite ends of the opening 17 at the surface of the panel member 14 facing panel member 13 securely fix the panel member 14 against relatively movement axially of the fasteners 16 and thereby maintain the panel members 13 and 14 is uniformly spaced apart relation compatible with smooth sliding motion of the panel members against the surface areas of the stator 10 confined therebetween.

Contact clips 21 secured to the stator 10 occupy spaced apart positions along a course parallel to the longitudinal edges of the slots 15 within an area of the face of the stator outside the confines of area 11. Each clip includes inner end portions facing toward area 11 which are bent and rounded to provide oppositely facing resilient double wiping jaws 22. Each contact clip 21 has a wiring lug 23 at the end thereof facing away from the area 11 to provide means for electrical connection of the clip to circuit conductors or electrical components (not shown) such as coils, resistors, capacitors, etc. The area between the writing lug 23 and the jaws 22 is provided with a narrow slot 24 of elongated dimension extending lengthwise of the distance between said lug 23 and jaws 22. A fastener comprising a flat sheet metal stamping provides a shank 25 which has wedging entry to the slot 24 in the contact clip 21 and to a matching slot intersecting opposite surfaces of the stator in registry with the slot 24. A head defined by one end portion of the shank 25 and staking ears 26 at the opposite end portion of the shank 25 have engagement with the surfaces of the stator 10 bordering the slot 24 and the surfaces of the contact clip 21 facing the shank 25 to secure the fastener and the contact clip 21 in firmly anchored relation to the stator 10. Similar contact clips 27 are fixed to the opposite face of the stator 10 by means of fasteners 28 which likewise provide rigid connection between the contact clips 27 and the fasteners 28 and the stator 10 in the manner that the contact clips 21 are anchored to the stator 10.

While the panel members 13 and 14 are thus movable fore and aft of a fixed line of travel established by the slots 15 in the stator 10 and the faces of the panel fasteners 16 riding against the opposite longitudinal edges of the slots 15, the stator contact clips 21 via the wiping jaws 22 are engaged in turn by contact blades 29 secured to the panel member 13 and the corresponding wiping jaws of the contact clips 27 fixed to the opposite face of the stator 10 are likewise engaged in turn by similar contact blades 30 secured to the panel member 14. Each of said contact blades 29 and 30 have integral fingers 31 which project through openings 32 provided in spaced apart relation along the edge of the panel member associated therewith and each finger 31 has an end portion 33 which is bent into engagement with the surface of the associated panel member facing the stator 10 so as to rigidly fasten the contact blade against the surface of the panel member underlying the blade. A slot or groove 34 is provided in the stator 10 to define a free space in which the bent over end portions 33 of the fingers 31 on the panel members 13 and 14 have clearance during movement of the panel members incident to effecting engagement of the contact blades 29 and 30 with selected stator contact clips.

While the stator and its contact clips 21 and 27 are thus drawn into a state of rigid assembly by the fasteners associated therewith, as described above, it should be observed that the placement of said fasteners so as to present the longest dimension thereof in crosswise relation to the line of travel of the contact blades on the panel members 13 and 14 provides added resistance to relative angular displacement of the clips 21 and 27 about the fastener as an axis under stresses applied to said clips while undergoing engagement and disengagement action with said contact blades on the panel members.

Integral extensions of the panel members 13 and 14 in a direction lengthwise of the line of travel of said panel members define arms 13a and 14a respectively between which an actuating handle 35 is suitably secured so as to provide means for conveniently operating the panel members between opposite limits of sliding movement relative to the stator 10. A spring 36 secured at one end to a slot 37 in the panel member 13 and at its other end to a bracket 38 fixed to the stator 10 by means of suitable fastening means such as rivets 39 acts to normally bias the panel members 13 and 14 to occupy a position at one of said limits of sliding movement as shown in FIG. 1 and FIG. 2.

From the foregoing description it is apparent that the present invention provides for relatively close spacing of the stator contact clips while retaining required structural integrity of the switch and at the same time incorporating features of design and construction that adds to the simplicity and reliable assembly thereof.

Since numerous changes may be made in the above described construction and different embodiments of the invention may be made to suit varying requirements without departing from the spirit and scope thereof, it is intended that all matter contained in the foregoing description or shown in the accompanying drawing shall be interpreted as illustrative and not in a limiting sense.

What is claimed is:

1. An electric switch including a stator of rigid insulating material having first and second opposed faces, each of said faces having a generally flat first area with the first area of each face in opposed parallel relation to the first area of the other face of said stator, elongated slots of uniform width throughout the length of said slots intersecting the faces of said stator within the confines of the first area of said faces and occupying spaced apart positions long a straight line parallel to the opposed longitudinal edges of said slots, a plurality of contact clips fixed to said stator and occupying spaced apart positions along a course parallel to the opposed longitudinal edges of said slots in the stator within a second area of the first face of the stator outside the confines of said first area of the first face of the stator but facing in the direction of the first area of said first face of the stator, a slider assembly including a first panel member and a second panel member disposed against opposite faces of the stator so as to overlap only the first areas of said faces of the stator, each of said slots in the stator being occupied by a fastening member rigidly interconnnecting said panel members so as to maintain said panel members in uniformly spaced apart relation compatible with accommodating sliding motion of the panel members against said first areas of the stator faces opposite thereto, each of said fastening members having opposed flat parallel faces at such limited distance apart as to have entry to said slot in the stator associated therewith while the faces of each fastener have riding engagement with the opposite longitudinal edges of the slot, said fastening members being spaced apart a distance to accommodate movement of the panel members lengthwise of said slots according to a range of travel as required to dispose said panel members in selected operating positions relative to said contact clips fixed to said stator, and a contact blade secured to the panel member overlapping the first area of the first face of said stator which has circuit closing engagement in turn with said contact clips fixed to said second area of the first face of the stator in response to said sliding motion of the panel members along the line of travel established by said fastening members interconnecting said panel members and the edges of the slots facing said fastening members.

2. An electric switch according to claim 1 wherein a second plurality of contact clips are fixed to said stator and occupy spaced apart positions along a course parallel to the line of travel of the panel members relative to the stator, and wherein a contact blade secured to the panel member overlapping the first area of the second face of said stator has engagement in turn with said second plurality of contact clips to eastablish circuit closing relation therewith in response to said sliding movement of the panel members.

3. An electric switch according to claim 1 wherein circuit closing engagement of said contact clips on the stator with the contact blade on the panel member is established resilient jaws defined by each of said contact clips at one end thereof, each of said contact clips having a wiring lug defined by the opposite end of said clips, a narrow slot of elongated dimension provided in the area between the wiring lug and the resilient jaws of each contact clip with the longest dimension thereof extending lengthwise of the distance between the wiring lug and the jaws of the contact clip, a slot intersecting opposite surfaces of the stator in registry with the slot of the contact clip, and means establishing fixed connection between each contact clip and the stator including a flat sheet metal stamping defining a shank having wedging entry in said slot in the contact clip and the slot in the stator in registry therewith with the faces of said shank extending lengthwise of the longest dimension of said slots.

4. An electric switch according to claim 1 wherein means are provided to bias said panel members toward one limit of sliding movement thereof relative to said stator.

5. An electric switch according to claim 1 wherein integral extensions of the panel members in a direction lengthwise of the line of travel of said panel members define a pair of arms, and an actuating handle is secured to said panel members via a portion of said handle positioned between said pair of arms.

References Cited

UNITED STATES PATENTS

| | | |
|---|---|---|
| 2,497,671 | 2/1950 | Harvey et al. _____ 200—16 XR |
| 2,691,702 | 10/1954 | Allison _____ 200—16 |
| 2,900,461 | 8/1959 | Allson. |

ROBERT K. SCHAEFER, Primary Examiner

J. R. SCOTT, Assistant Examiner

U.S. Cl. X.R.

200—18